May 1, 1962  P. L. JOHNSON ET AL  3,032,067
LOCK TYPE EXCESS FLOW VALVE
Filed March 18, 1960
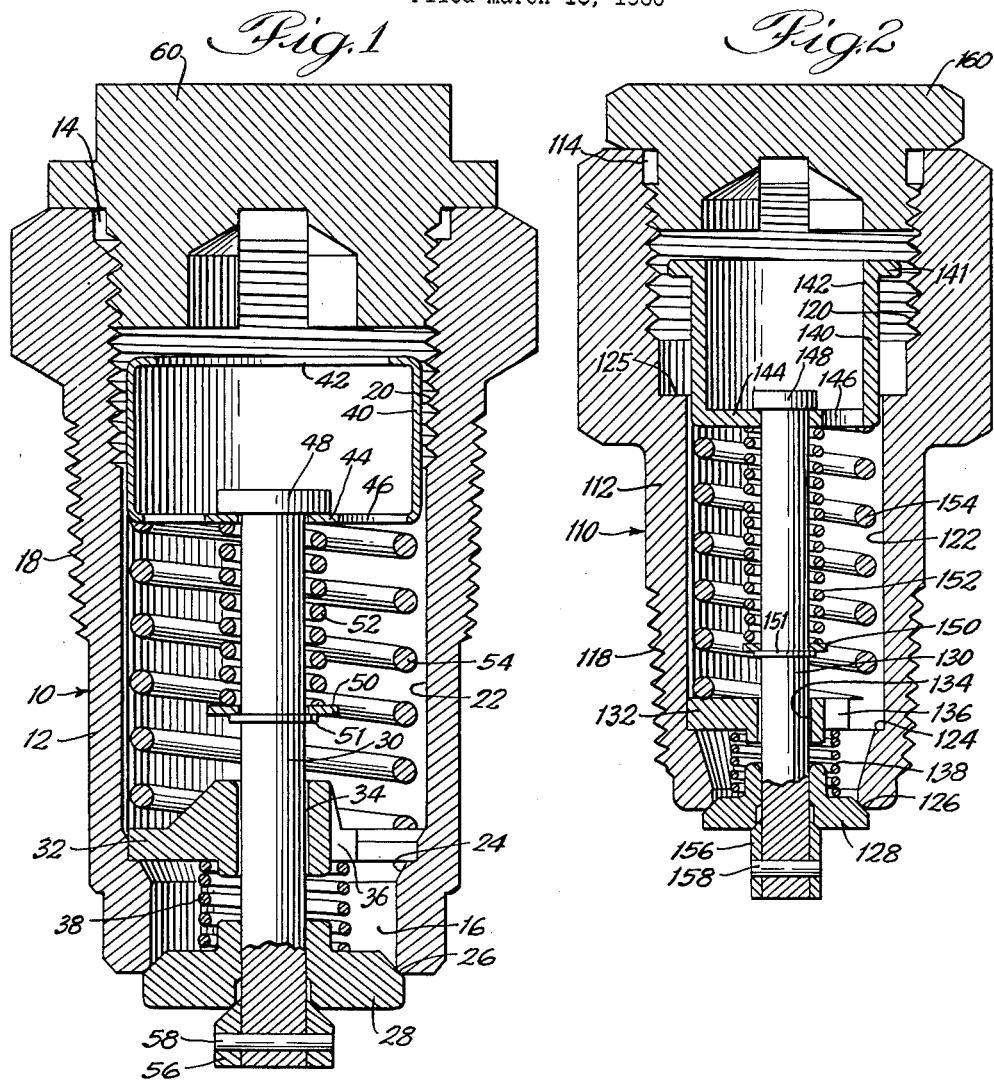
INVENTORS:
Philip L. Johnson
and Vernon E. Wilfong,
Bair, Freeman & Molinare
BY
ATTORNEYS.

3,032,067
LOCK TYPE EXCESS FLOW VALVE
Philip L. Johnson and Vernon E. Wilfong, Marshalltown, Iowa, assignors to Fisher Governor Company
Filed Mar. 18, 1960, Ser. No. 25,497
5 Claims. (Cl. 137—630)

This invention relates to improvements in lock type excess flow valves of the type used in filling or emptying fluid-containing tanks wherein the fluid is maintained under pressure.

The present invention represents improvements in the structure and operation of lock type excess flow valves of the kind disclosed in Smith et al. Patent No. 2,886,061. Further reference as to the state of the art may be made to Bragg Patent No. 2,834,377.

It is a primary object of this invention, therefore, to provide an improved lock type excess flow valve, wherein a pressure-equalized poppet valve operates automatically under spring load as an excess flow valve.

It is another object of this invention to provide a novel spring mounted retainer means operative to accommodate tolerance variations between the valve body and the associated pipe nipple of a conventional withdrawal connection, thereby enabling substantially unlimited utility for the valve with all conventional withdrawal connections and without risk of accidental damage to the valve parts because of over-threading.

It is a further object of this invention to provide improvements in a safe and efficient connecting means for both vapor and liquid transfer from liquefied petroleum gas storage tanks during system service.

Further objects and advantages of this invention will become apparent as the following description proceeds, and the features of novelty which characterize this invention will be pointed out with particularity in the claims annexed to and forming part of this specification.

A preferred embodiment of the invention is shown in the accompanying drawing, in which:

FIGURE 1 is a vertical cross-sectional view of a valve constructed in accordance with the present invention; and FIGURE 2 is another vertical cross-sectional view of an alternative structural embodiment of the present invention.

Referring now more particularly to FIGURE 1 of the drawing, we have designated generally at 10 a first embodiment of a lock type excess flow valve constructed in accordance with the features of the present invention. A substantially hollow main body 12 provides an outer open end 14 and an inner open end 16, directional reference being made relative to a contemplated associated storage tank. The body 12 is formed with a male taper pipe thread 18 for conventional mounting of the valve in a suitable fitting of a tank opening. A female taper pipe thread 20 is provided for receiving conventional withdrawal means. A main bore 22 of relatively large cross section is formed within the body 12, and includes a reduced portion and annular shoulder 24 at its inner end. The inner end of the body 12 defines an external annular valve seat 26.

A poppet 28 is disposed generally externally of the valve seat 26 for seating engagement in an outward direction. An elongated stem 30 slidably supports the poppet 28, and is itself supported for axially slidable reciprocation by means of a spider guide 32 and its guide bore 34. A plurality of flow ports 36 extend through the guide 32. An operating spring 38 is disposed between the guide 32 and the poppet 28, and is biased in compression to normally urge the poppet inwardly and away from the valve seat 26 for open flow.

A retainer member 40 is slidably reciprocable within the main body 12 and into the bore 22. The retainer 40 is slidably guided by the internal walls of the main body 12. The retainer 40 provides an enlarged top opening and a bottom wall 44 having a plurality of flow ports 46 therethrough. The stem 30 extends through the retainer bottom wall, and provides an enlarged head 48 for engagement therewith. In this way, positioning of the retainer 40 serves to determine limiting retention of the stem 30 in an inward direction and free sliding movement thereof in an outward direction.

A stop washer 50 is carried by the stem 30 at a fixed position determined by a snap ring 51. A retainer spring 52 is disposed in compression between the retainer bottom wall 44 and the stop washer 50, serving to normally position the retainer and stem as seen in FIGURE 1. A loading spring 54 is disposed in compression between the retainer 40 and the guide 32. The inner end of the stem 30 carries an enlarged head 56 by means of a cross pin 58, serving as a stop for the poppet 28. A cap 60, and a suitable gasket if desired, serves to provide a gas-tight closure for the body opening 14.

The practical operation of the valve 10 will now be described. As shown in FIGURE 1, the valve is in its closed, locked condition, which is the case when the valve is originally mounted in a liquefied petroleum gas container. When it is desired to put the valve into service, a standard threaded pipe nipple may be threaded into the taper 20. As such a nipple is turned into the valve body, it engages the outward end of the retainer 40, overcoming the force load applied by the loading spring 54. Continued engagement of the pipe nipple will cause the stem 30 to move inwardly and away from its locked engagement against the poppet 28. The axial movement of the retainer 40 is transmitted through the retainer spring 52 against the washer 50. Under these circumstances, internal pressures in the storage tank will cause the poppet 28 to maintain its closed position against the valve seat 26. The retainer spring 52 provides a sufficient force load to overcome the pressure in the container and thereby break the seal between the stem 30 and the poppet 28. The clearance between the external diameter of the stem 30 and the poppet 28 is such that an equalizing pressure passage not exceeding a No. 60 drill size is provided.

When entry of the pipe nipple has caused sufficient motion of the stem 30 in an inward direction to allow the snap ring 51 to engage the spider guide 32, no further motion of the stem 30 will occur. Further entry will only cause additional compression of the retainer spring 52. This important feature provides automatic compensation for the wide range of tolerance variations which may occur between the threaded section 20 and the cooperating threads of an associated pipe nipple.

When a pipe nipple is fully engaged to a wrench-tight condition, it is only necessary to close the conventional shut-off device attached to the outermost end thereof in order to allow pressure to equalize on both sides of the poppet 28. When these pressures are equalized, the load applied by the operating spring 38 will cause the poppet 28 to be opened automatically, thereby positioning the valve parts in operating relation as an excess flow valve.

It will also be seen that upon withdrawal of the pipe nipple, the relatively heavy force load applied by the loading spring 54 will serve to return the poppet 28 to its closed position. It is then only necessary to replace the closure cap 60 to return the valve to its original locked condition.

In FIGURE 2 of the drawing we have disclosed an alternative embodiment 110. The basic structure and operation of this second embodiment are substantially identical with the device of FIGURE 1. Like parts have been similarly numbered as a "100" series. The primary structural difference relates to the provision of an enlarged annular lip 141 at the top wall of the retainer member 140. An additional annular shoulder 125 at the outward end of the main body bore 122 provides a cooperating abutment stop for limiting the inward movement of the retainer 140 into the bore 122 of the main body 112.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What we claim as new and desire to secure by Letters Patent of the United States is:

1. A lock-type excess flow valve comprising an open-ended hollow tubular body providing a valve seat at its one end, a poppet for seating engagement with said valve seat in a direction toward said one end, an elongated stem within said body axially slidably supporting said poppet, guide means within said body axially slidably supporting said stem, operating spring means urging said poppet away from said valve seat, said elongated stem having stop means adjacent said one end and in engagement with said poppet for retaining said poppet on said elongated stem, retainer means slidably reciprocable within said body, said stem extending in slidably cooperative relation into said retainer means for relatively free movement in a poppet-closing direction and for limiting retention by said retainer in a poppet-opening direction, retainer spring means between said retainer and stem urging said retainer in a poppet-closing direction against an enlarged head on said stem, and loading spring means urging said retainer means away from said one end, whereby said poppet is retained in closed position and cooperates with said operating spring means to perform an excess flow valving action only upon shifting of said retainer means against said loading spring means to release said stem for slidable movement.

2. A lock-type excess flow valve comprising an open-ended hollow tubular body providing an external valve seat at its container-inward end, a poppet disposed generally externally of said valve seat for seating engagement therewith when the poppet is moved in a container-outward direction, an elongated stem within said body axially slidably supporting said poppet, fixed guide means within said body axially slidably supporting said stem, operating spring means urging said poppet away from said valve seat, said elongated stem having stop means adjacent said one end and in engagement with said poppet for retaining said poppet on said elongated stem, retainer means slidably reciprocable within said body, said stem extending in slidably cooperative relation into said retainer means for relatively free movement in a poppet-closing direction and for limiting retention by said retainer in a poppet-opening direction, retainer spring means between said retainer and stem urging said retainer in a poppet-closing direction against an enlarged head on said stem, and loading spring means urging said retainer means in said container-outward direction, whereby said poppet is retained in closed position and cooperates with said operating spring means to perform an excess flow valving action only upon shifting of said retainer means against said loading spring means to release said stem for slidable movement.

3. A lock-type excess flow valve comprising an open-ended hollow tubular body providing an external valve seat at its container-inward end, a poppet disposed generally externally of said valve seat for seating engagement therewith when the poppet is moved in a container-outward direction, an elongated stem within said body axially slidably supporting said poppet, fixed guide means within said body axially slidably supporting said stem and providing a limiting stop therefor in a poppet-opening direction, operating spring means urging said poppet away from said valve seat, said elongated stem having stop means adjacent said one end and in engagement with said poppet for retaining said poppet on said elongated stem, retainer means slidably reciprocable within said body, said stem extending in slidably cooperative relation into said retainer means for relatively free movement in a poppet-closing direction and for limiting retention by said retainer in a poppet-opening direction, retainer spring means between said retainer and stem urging said retainer in a poppet-closing direction against an enlarged head on said stem, and loading spring means urging said retainer means in said container-outward direction, whereby said poppet is retained in closed position and cooperates with said operating spring means to perform an excess flow valving action only upon shifting of said retainer means against said loading spring means to release said stem for slidable movement.

4. A lock-type excess flow valve comprising an open-ended hollow tubular body providing an external valve seat at its container-inward end, a poppet disposed generally externally of said valve seat for seating engagement therewith when the poppet is moved in a container-outward direction, an elongated stem within said body axially slidably supporting said poppet, fixed guide means within said body axially slidably supporting said stem and providing a limiting stop therefor in a poppet-opening direction, operating spring means urging said poppet away from said valve seat, said elongated stem having stop means adjacent said one end and in engagement with said poppet for retaining said poppet on said elongated stem, retainer means slidably reciprocable within said body, said stem extending in slidably cooperative relation into said retainer means for relatively free movement in a poppet closing direction and for limiting retention by said retainer in a poppet-opening direction, retainer spring means between said retainer and stem providing a force greater than a predetermined container pressure for urging said retainer in a poppet-closing direction against an enlarged head on said stem, and loading spring means urging said retainer means in said container-outward direction, whereby, upon pressure equalization on both sides of said poppet, and after shifting of said retainer means against said loading spring means to release said stem for slidable movement, said operating spring means effects opening of said poppet to perform an excess flow valving action.

5. A lock-type excess flow valve comprising an open-ended hollow tubular body providing an external valve seat at its container-inward end, a poppet disposed generally externally of said valve seat for seating engagement therewith when the poppet is moved in a container-outward direction, an elongated stem within said body axially slidably supporting said poppet, fixed guide means within said body axially slidably supporting said stem and providing a pressure equalizing flow path therebetween, operating spring means urging said poppet away from said valve seat, said elongated stem having stop means adjacent said one end and in engagement with said poppet for retaining said poppet on said elongated stem, retainer means slidably reciprocable within said body, said stem extending in slidably cooperative relation into said retainer means for relatively free movement in a poppet-closing direction and for limiting retention by said retainer in a poppet-opening direction, retainer spring means between said retainer and stem providing a force greater than a predetermined container pressure for urging said retainer in a poppet-closing direction against an enlarged head on said stem, and loading spring means urging said retainer means in said container-outward direction, whereby, upon pressure equalization on both sides of said poppet by means of said equalizing flow path, and after shifting of said retainer means against said loading spring means to release said stem for slidable movement, said operating spring means effects opening of said poppet to perform an excess flow valving action.

References Cited in the file of this patent

UNITED STATES PATENTS 2,886,061 Smith _____ May 12, 1959

FOREIGN PATENTS 517,819 Mack—France _____ Dec. 22, 1920